Figure 1:
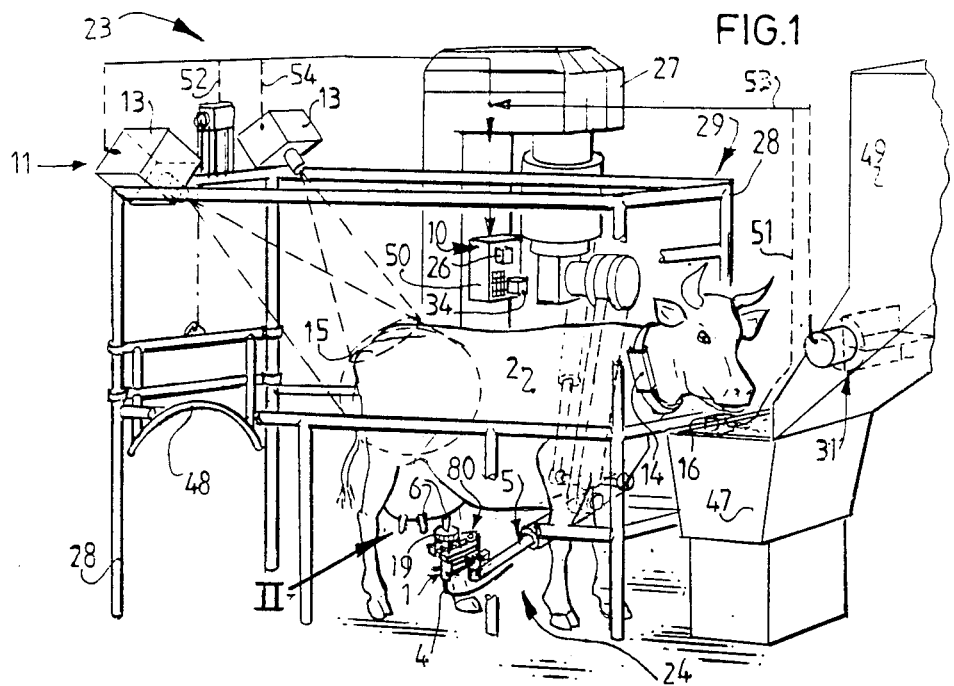

United States Patent [19]

Torsius

[11] Patent Number: 4,726,322
[45] Date of Patent: Feb. 23, 1988

[54] MILKING APPARATUS

[76] Inventor: Aalbert Torsius, Stoutenburgerlaan 10, Netherlands

[21] Appl. No.: 898,501
[22] Filed: Aug. 21, 1986

[30] Foreign Application Priority Data

Sep. 4, 1985 [NL] Netherlands .......................... 8502434

[51] Int. Cl.[4] .............................................. A01J 5/04
[52] U.S. Cl. ............................... 119/14.14; 250/222.1
[58] Field of Search ............... 119/14.01, 14.02, 14.03, 119/14.04, 14.05, 14.1, 14.11, 14.14, 14.27; 250/221, 222, 578, 209, 560; 324/178; 356/376, 377, 378, 379, 380, 381, 382, 383, 384, 385, 386, 387

[56] References Cited

U.S. PATENT DOCUMENTS

| 4,385,590 | 5/1983 | Mortensen | 119/14.14 X |
| 4,516,530 | 5/1985 | Reissies et al. | 119/14.14 X |
| 4,590,410 | 5/1986 | Jonsson | 250/222.1 X |
| 4,645,919 | 2/1987 | McCaleb | 250/221 X |

FOREIGN PATENT DOCUMENTS

| 188303 | 7/1986 | European Pat. Off. | 119/14.14 |
| 189954 | 8/1986 | European Pat. Off. | 119/14.14 |

Primary Examiner—William F. Pate, III
Assistant Examiner—Creighton Smith
Attorney, Agent, or Firm—John P. Snyder

[57] ABSTRACT

The milking apparatus does not need the continuous presence of the dairy farmer. A mobile member coupled with a teat cup follows the free movements of one or more teats of a cow by means of detection member and by means of control means coupled with the mobile member.

Detection means for detecting the position of the teat can comprise first and second light radiating elements as well as first and second light receiving elements.

The milking apparatus can make use of a generally available robot or be designed separately.

20 Claims, 6 Drawing Figures

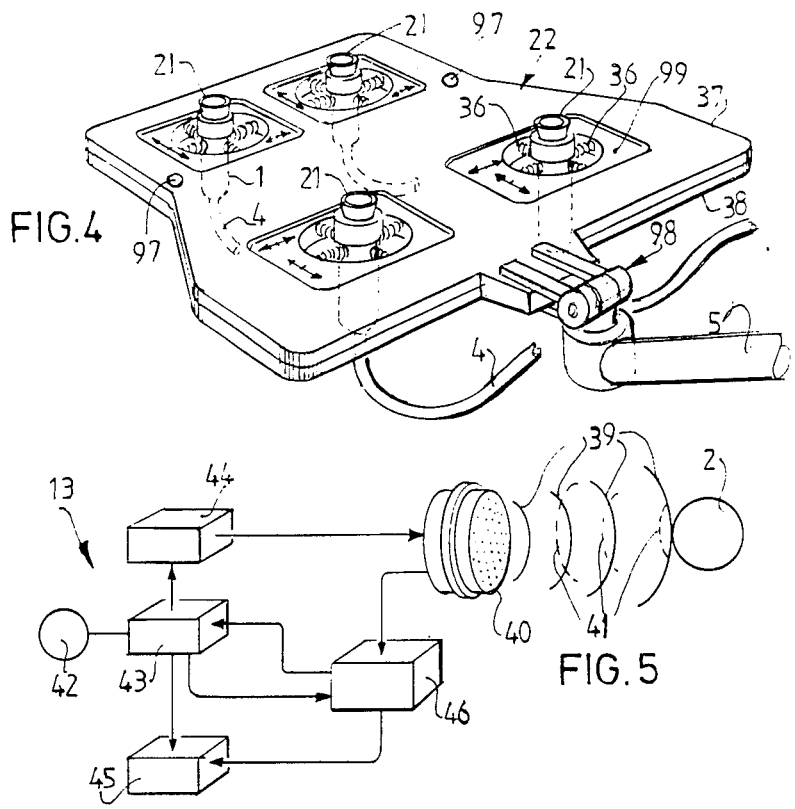
FIG. 4
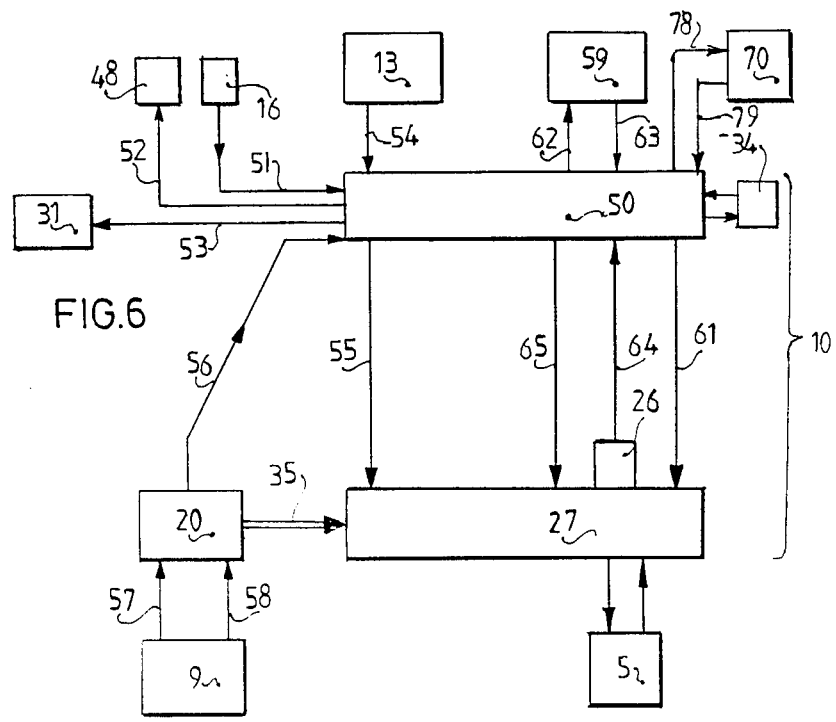
FIG. 5
FIG. 6

MILKING APPARATUS

The invention relates to a milking apparatus according to the preamble of claim 1.

In such a milking apparatus a teat cup is fitted manually by a dairy farmer round a teat of a cow. The drawback here is the necessity for the continuous presence of the farmer and the manual work he has to perform.

The purpose of the invention is to provide a milking apparatus where the teat cup is fitted automatically around the teat.

This is achieved with the milking apparatus in accordance with the feature of claim 1.

It is possible with the milking apparatus according to the invention to fully automate the milking of cows without it being necessary for the cow to be restrained or tied up, which is undesirable from the point of view of the peace of mind of the cow and therefore bad for its milk production, and which will not encourage the cow to approach the milking apparatus of its own accord. In the milking apparatus according to the invention the teat cup follows the free movements of the teat of the cow.

Use is preferably made of the milking apparatus as claimed in claim 2, which ensures accurate fitting of the teat cup around the teat.

Figure 3:
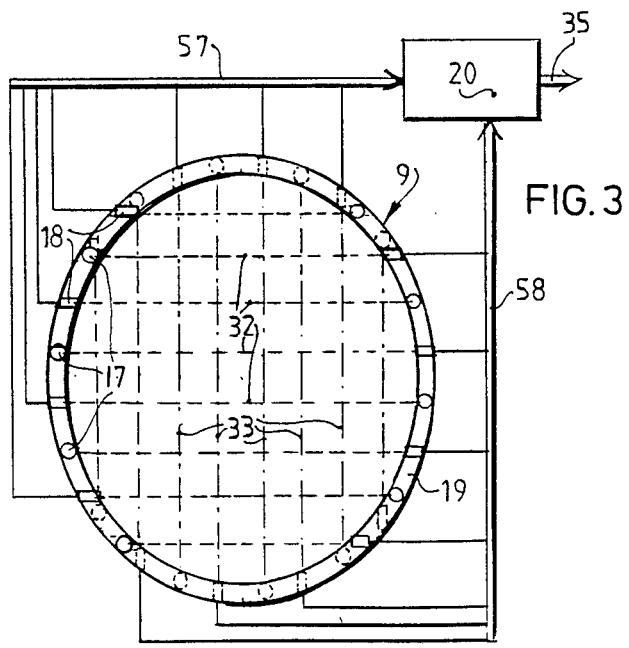
Figure 2:
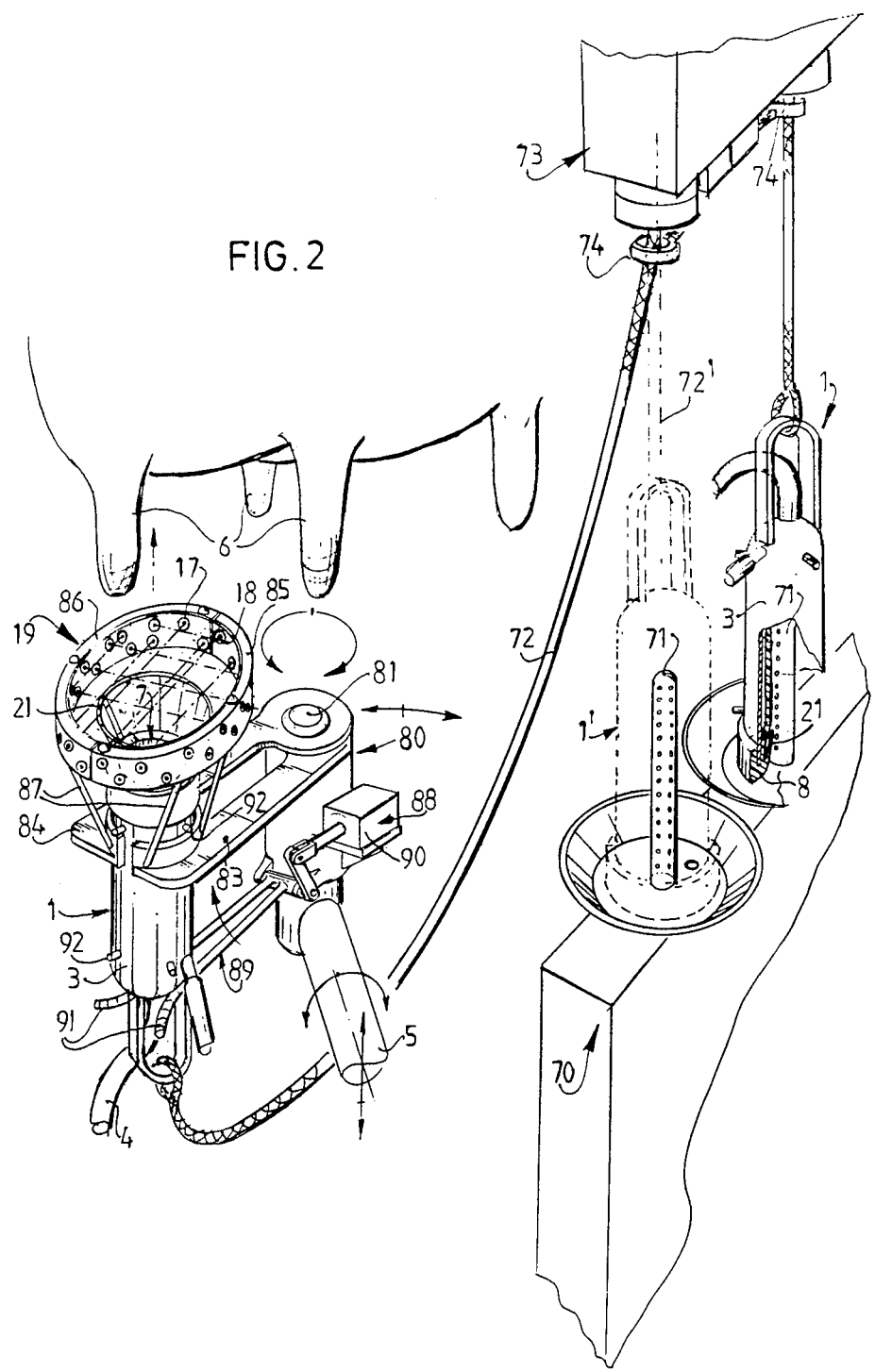

The further advantages and features of the milking apparatus will be described with reference to a drawing, in which:

FIG. 1 shows a perspective, partly schematic view of an embodiment of a milking apparatus according to the invention, FIG. 2 shows detail II from FIG. 1, FIG. 3 is a diagram of the detection member from FIG. 2, FIG. 4 shows another embodiment of a detail of the milking apparatus according to the invention, FIG. 5 is a diagram showing the operation of an ultrasonic detector from FIG. 1; and FIG. 6 shows a block diagram of the operation of the milking apparatus as according to FIG. 1.

The milking apparatus 23 according to the invention (FIGS. 1, 2) comprises a suction device (not shown) for drawing off milk during the milking of a cow 2 via a line 4 attached to at least one teat cup 1 provided with an opening 7, a mobile member 5 attached to teat cup 1 in the form of for example an arm of a robot 27 that is per se known which comprises control means 10, for example in the form of a standard control computer associated with it, which mobile member 5 can be moved three dimensionally by the control computer in order to move teat cup 1 around and off a teat 6 of cow 2. Teat cup 2 is in addition provided with a ring 19 furnished with light radiating and light collecting elements, 17, 18 which form a detector member 9 for generating to the mobile member 5 position signals concerning teat 6 when it is located within the ring 19 during the fitting of teat cup 1.

The detector member 9 can also be formed for example by at least one ultrasonic transmitter/receiver arranged in the proximity of opening 7 of teat cup 1, which at an angle of opening of 20 degrees can detect the teat 6 of cow 2 at a distance of about 10 cm. Preferably two ultrasonic transmitter/receivers are fitted, providing position signals to for example two devices at right angles to each other, so that the momentary position of teat cup 1 is determined relative to the teat 6.

If a control circuit 26 forming part of control means 10 indicates that the teat 6 is located in a pre-determined position relative to the ring 19 of teat cup 1, for example in its centre, control circuit 26 gives the command to the control means 10 that the teat cup 1 can be arranged wholly around teat 6, so that the suction device then sets into operation the intermittent underpressure for milking. During milking the cow 2 is in a determined space 24, for example a concentrated feed pen 29 consisting of rails 28 which forms part of milking apparatus 23, and it can move about freely in the space since the milking apparatus 23 according to the invention automatically follows every movement of its teats 6.

The milking apparatus according to an embodiment of the invention (FIG. 1) is further provided with measuring means 11 in the form of at least one ultrasonic detector 13—preferably two detectors 13 are disposed transversely of each other and directed downward at an angle of 20 degrees in order to have as little possible disturbance from tail movements and body deformations of the cow—for determining the position of a contour of a cow 2 located in the concentrated feed pen 29. By making use of this and a code stored in a transponder 14 placed on the cow 2 and read by a reading member 16, which code, using a memory forming part of the control means 10, determines the distance between the teat 6 and, for example, the hind-quarters 15 of this cow 2, the control means 10 are driven such that with the aid of the arm of robot 27 the teat cup 1 is carried accurately around the teat 6 of cow 2.

Teat cup 1 (FIG. 2) consists of a holder part 3 with a teat accommodating part 8 arranged around it which is provided with a guide edge 21 for guiding the slack teat when teat cup 1 is carried round the teat 6. The ring 19 is arranged above guide edge 21. Arranged in two directions on the ring 19 for determining the position of teat 6 within ring 19 are two series of light radiating elements 17 each of which co-operates with light collecting elements 18, whereby the first series is arranged for the one direction above the second series for the other direction so that it is possible to arrange eight co-operating elements 17, 18 in both directions along the ring 19, whereby the beams of light 32 from the first series are at right angles to the beams of light 33 of the second series (FIG. 3) and the series extend in planes parallel to each other.

The ring is preferably elliptical in shape, whereby the long axis of the ellipse extends lengthwise of the cow, since it is in this lengthwise direction that the greatest deviation in the position of the teat can be expected.

Arranged on the rotating and up and downwardly reciprocating mobile member 5 is, for example, a gripper member 80 gripping onto teat cup 1 and rotating around a shaft 81 which member can be controlled by control means 10 just as the reciprocating movements and the rotation. Ring 19 is firmly attached above guide edge 31 to gripper member 80 using support rods 87, while when parts 83 and 84 of gripper member 80 are slightly loosened teat cup 1 can slide up and downward in that gripper member 80 between stops 92 by means of a drive member 88, for example an electromagnet provided with a lever 89 which can also be activated by the control means 10, whereby fingers 91 of the lever can grip round line 4 and below teat cup 1. Ring 19 consists of two ring parts 85 and 86 which are each coupled to the gripper parts 83 and 84 respectively, so that when gripper member 80 opens, the ring 19 also opens. If it is ascertained by ring 19 that the teat is situated in the centre of ring 19, this is relayed to control means 10 which disengage the gripper member 80 slightly and activate drive member 88 so that teat cup 1 is moved upwards, whereby the flexible guide edge 31 guides the teat and the suction device causes underpressure to be created in the teat cup 1 so that teat cup 1 is brought into the milking position entirely encircling the teat 6 of cow 2, after which gripper member 80 and therefore ring 19 are opened and a following teat cup 1 can be picked up and carried round the following teat.

In the above described operation of the milking apparatus according to the invention the cow is not touched by any moving part of the milking apparatus, since the shaft 81 of gripper member 80 is located underneath the teats 6 of the cow 2 and the teat cup 1 can be moved upwards relative to ring 19. It is also possible to give the support rods 87 a spring-mounted, telescopic form, so that when teat cup 1 is fitted the ring 19 is moved downwards relative to this teat cup, whereby the milking cup is then moved by the mobile member 5 upwards into the milking position entirely encircling the teat 6 of cow 2.

Using gripper member 80 teat cups 1, 1 are each picked up by the robot from a cleaning apparatus 70 where they are arranged on sprayers 71 for cleaning. After milking of a cow—the reduction of the milk flow is observed by measuring means that are per se known—using traction cables 72, which form part of an already known removal device 73, teat cups 1 are withdrawn from the teats 6 and drawn as far as a stop 74, from which position they are then moved downwards onto the sprayers 71.

In teat cup 1 from FIG. 2 the teat cup has for example an outer diameter of 60 mm., the opening is 25 mm. in section, the longitudianl axis of the elliptical ring is 80 mm. and the short axis 65 mm., the ring 19 is located about 10 mm. above opening 7 and the conical guide edge forms as far as possible the connection between opening and ring.

If a teat 6 is situated inside the ring 19, whereby each series consists of eight light collecting and eight light radiating elements 18 and 19 respectively, particular light beams are interrupted so that the corresponding light collecting elements 18 generate a signal which is fed to a code converter 20 which converts these signals into two digital numbers each indicating a dimension in a format such that the code 35 at the output can be supplied directly to the control of the robot, ensuring that teat movements up to high speeds are followed (FIG. 3). Code converter 20 can be for example a ROM memory, a PAL circuit or a FPLA circuit.

FIG. 4 shows a milking rack 22 provided with the four teat cups 1, whereby one, two, three or four teat cups 1 can be provided with a ring 19 furnished with light radiating and light collecting elements 17 and 18 respectively. Teat cups 1 are each provided with a guide edge 21 and are arranged spring-mounted by helical springs 36 in slide pieces 99 between a lower plate 38 and an upper plate 37 of the milking rack 22, whereby, using a gripper 98 attached to the mobile member 5 or using other engaging means the slide pieces are fixed in such mutual positions that the milking rack matches the teat positions of the cow in the concentrated feed pen. This is possible because the cow is recognized, following which a cleaning device (not shown) is activated via the control means, this device being provided with adjustable sprayers, so that while the lower and upper plate 38 and 37 of the milking rack are not clamped together slide pieces 90 are set to the positions appropriate for this particular cow and remain fixed there by clamping.

By making use of the milking rack it is possible to simplify the drive of the mobile member 5, since less complex movements need to be performed by the rack than with a single teat cup.

Milking rack 22 can also be provided with positioning elements 97 each of which co-operates with a companion element fitted on the udder of the cow so that either the positioning of the teat cups is carried out more easily or the rings above the teat cups can be dispensed with.

With the per se known ultrasonic detector 13 (FIG. 5), a transducer 40 transmits wave fronts 39 to a cow 2, shown schematically. The wave fronts 41 reflected when the cow 2 is present are received by the transducer 40 which is regulated by a control member 43 driven by a block 42, which member controls alternately a transmitter element 44 and a receiver element 46 for alternating transmitting and receiving by the transducer 40. Using the measuring member 45 the distance from the cow 2 to the transducer 40 is determined. The above operation is repeated continuously.

The operation of milking apparatus 23 according to the invention will now be described with reference to FIG. 6, in which previously named parts are given the same reference number. The arrows show connections between the different parts of the milking apparatus 23. Control means 10 consist of a control computer 50 having an associated memory 34 and the robot control means 27. If a cow 2 goes into the concentrated feed pen 29 forming part of a milking apparatus 23, the code stored in transponder 14 is directed using the reading element 16 to control computer 50 via connection 51. If the cow 2 must be fed, which information is stored in memory 34, a movable bar fence 48 is closed via connection 52 and a inlet valve between concentrated feed reservoir 49 and a feed trough 47 is opened via connection 53 so that the cow 2 can feed.

If the cow 2 must be milked, this information likewise being stored in memory 34, the position of the hindquarters 15 of cow 2 is called up by the control computer 50 from the or each ultrasonic detector 13 via connection 54, and the relative position of the hindquarters 15 relative to the teat of this cow is called up from memory 34 after which, under the continuous control of the or each ultrasonic detector 13 via conection 55 teat cup 1 is carried by way of robot 27 around teat 6 of cow 2. As soon as opening 7 is located around teat 6, this information is passed by detection member 9 via code converter 20 to control computer 50 via connection 56, following which control of the mobile member 5 in the form of the robot 27 is taken over directly by the signals 57 and 58 obtained for both dimensions from the detection member 9, these signals being converted into code 35 by the code converter 20. If the teat is situated in a pre-determined position relative to the opening of teat cup 1, for example in the centre of it, a control circuit 26 gives a command 64 to control computer 50 which in turn via connection 61 has the milking cup carried wholly around the teat while continually following the position of the teat, whereby the control computer sets the suction device 59 in operation via signal 62.

The information that the cow has been milked, and if necessary its new teat positions, are written into the memory. During the lactation period of a cow the size of the udder and therefore the position of the teats are always changing. If not more milk is being extracted, the milking apparatus is detached. Finally the cleaning apparatus 70 is set in operation via connection 78 and the information that the teat cup is once again in position is returned via connection 79.

Since the dairy farmer can no longer feel with his hand if a particular cow has inflamed teats—so called mastitis—a measuring device is arranged in the milking apparatus according to the invention for measuring the electrical conductivity of the milk obtained from the cow and arranged connected to this are redirecting means for redirecting the milk away from the reservoir when a predetermined threshold value of a deviation in the measured electrical conductivity relative to a predetermined value is exceeded, so that the milk of a cow with inflamed teats is not mixed with the milk from healthy cows.

What is claimed is:

1. Milking apparatus comprising the combination of a suction device for drawing off milk during the milking of a cow via an opening arranged in a teat cup and a line attached to said teat cup for carrying milk to a reservoir, a mobile member coupled with the teat cup to move it three dimensionally, a detection member arranged in the proximity of said opening for supplying position signals relating to a momentary position of a teat of the cow to be detected relative to said detection member, control means for bringing said detection member in the detection area, in which the position of the teat of the cow present in a particular space is detected by said detection member, whereby the position signals serve as input for the control means in order to bring said teat cup into a predetermined position relative to the momentary position of said teat and in order to follow this momentary position, and by a control circuit for generating a control command to said control means to move said teat cup upwards into the milking position when this predetermined position has been reached.

2. Milking apparatus as claimed in claim 1, characterized in that to bring detection member into the detection area a contour of the cow is measured using measuring means and that the control means are controlled by a measurement signal from said measuring means and by an output signal from a reading element for reading a code transmitted by a transponder placed on the cow, which code determines the relative distance between this contour and the teat.

3. Milking apparatus as claimed in claim 2, characterized in that the measuring means consist of at least one ultrasonic detector for measuring the position of the hind-quarters of the cow.

4. Milking apparatus as claimed in claim 1, characterized in that the detection member is formed by two series of at least two light radiating elements, whereby light radiating elements of the same series transmit beams of light parallel to each other and whereby the beams of light of the two series intersect at an angle, whereby the two series of light beams extend in two planes parallel to each other, and by at least two series of two light collecting elements each co-operating with a light radiating element, which generate a signal when the beam of light transmitted by said light radiating element is interrupted.

5. Milking apparatus as claimed in claim 2, characterized in that the detection member is formed by two series of at least two light radiating elements, whereby light radiating elements of the same series transmit beams of light parallel to each other and whereby the beams of light of the two series intersect at an angle, whereby the first and second series of light beams extend in two planes parallel to each other, and by at least two series of two light collecting elements each co-operating with a light radiating element, which generate signal when the beam of light transmitted by said light radiating element is interrupted.

6. Milking apparatus as claimed in claim 5, characterized in that the light radiating elements and the light collecting elements are fitted to a ring arranged above the opening, whereby the first series of light beams is at right angles to the second series of light beams and whereby the first series of light radiating elements is arranged above the second series thereof.

7. Milking apparatus as claimed in claim 6, characterized in that the ring is substantially elliptical in shape whereby the long axis of the ellipse extends substantially lengthwise of the cow.

8. Milking apparatus as claimed in claim 6, characterized in that light collecting and light radiating elements are arranged alternately along the ring.

9. Milking apparatus as claimed in claim 5, characterized in that each series consists of eight light radiating elements which each co-operate with a light collecting element and that the signals thereby obtained are converted by a code converter into a digital code which determines the position of the teat in the opening.

10. Milking apparatus as claimed in claim 1, characterized by a flexible guide edge of the teat cup guiding the teat when the cup is being fitted on.

11. Milking apparatus as claimed in claim 6, characterized in that the ring and a gripper member gripping on the teat cup, which member can be opened and closed via two parts pivoting relative to each other, are attached for movement relative to each other to the mobile member and that the ring consists of at least two parts each of which is attached to a respective part of said gripper member such that said ring is opened and closed with said gripper member.

12. Milking apparatus as claimed in claim 1, characterized by a milking rack comprising four teat cups, whereby at least one teat cup is provided with detection member and whereby the remaining teat cups are arranged for movement relative to one another and each is spring-mounted.

13. Milking apparatus as claimed in claim 12, characterized in that the teat cups are arranged spring-mounted in slide pieces and that said slide pieces can be adjusted relative to one another using a cleaning installation provided with four sprayers that are adjustable relative to one another using control means.

14. Milking apparatus as claimed in claim 1, characterized by four teat cups each provided with a detection member.

15. Milking apparatus as claimed in claim 1, characterized by two ultrasonic detectors arranged transversely of each other and directed slanting downwards.

16. Milking apparatus as claimed in claim 15 characterized in that the ultrasonic detectors are directed downwards at an angle of about 20 degrees.

17. Milking apparatus as claimed in claim 1, characterized in that a supply valve for cattle feed can also be operated by the control means and that in a memory coupled with said control means information is stored relating to the milking time and the amount of feed for the cow concerned.

18. Milking apparatus as claimed in claim 1, characterized in that in each case after the fitting of the or each teat cup any new position of the or each teat relative to the hind-quarters of the cow is stored in a memory coupled with the control means.

19. Milking apparatus as claimed in claim 1, characterized by a measuring device for measuring the electrical conductivity of milk obtained from the cow, and by redirecting means for redirecting milk from the reservoir when a pre-determined threshold value of a deviation in the measured electrical conductivity relative to predetermined value is exceeded.

20. Milking apparatus comprising the combination of teat-receiving means for reception and retention of a cow's teat, means connected with the teat-receiving means for withdrawing milk from a teat received and retained therein, means for moving the teat-receiving means vertically and horizontally relative to a cow to be milked, detection means carried by the teat-receiving means for detecting the relative position of the teat-receiving means below the teat to be received in the teat-receiving means, and control means connected with the detection means and with the means for moving the teat-receiving means for moving the teat-receiving means into receiving and retaining position with a teat detected to be within the range of movement of the means for moving the teat-receiving means.

* * * * *